(12) United States Patent
Fauteux et al.

(10) Patent No.: US 11,196,095 B2
(45) Date of Patent: Dec. 7, 2021

(54) BATTERY PACKS AND METHOD OF ASSEMBLING BATTERY PACKS

(71) Applicant: TTI (MACAO COMMERCIAL OFFSHORE) LIMITED, Macau (CN)

(72) Inventors: Denis Gaston Fauteux, Kwai Chung (CN); Hei Man Raymond Lee, Kwai Chung (CN); Jian Guo Zhao, Dongguan (CN); Yuan Bai Wu, Dongguan (CN)

(73) Assignee: Techtronic Cordless GP, Anderson, SC (US)

(*) Notice: Subject to any disclaimer, the term of this patent is extended or adjusted under 35 U.S.C. 154(b) by 432 days.

(21) Appl. No.: 16/065,996

(22) PCT Filed: Feb. 26, 2016

(86) PCT No.: PCT/CN2016/074731
§ 371 (c)(1),
(2) Date: Jun. 25, 2018

(87) PCT Pub. No.: WO2017/143597
PCT Pub. Date: Aug. 31, 2017

(65) Prior Publication Data
US 2019/0020072 A1 Jan. 17, 2019

(51) Int. Cl.
*H01M 10/42* (2006.01)
*H02J 7/00* (2006.01)
(Continued)

(52) U.S. Cl.
CPC ....... *H01M 10/425* (2013.01); *H01M 50/213* (2021.01); *H01M 50/502* (2021.01);
(Continued)

(58) Field of Classification Search
CPC ........ H02J 7/0042; H01M 2/30; H01M 2/204; H01M 2/105; H01M 2/0217;
(Continued)

(56) References Cited

U.S. PATENT DOCUMENTS

| 2004/0257033 A1* | 12/2004 | Kubota | H01M 10/0413 320/107 |
| 2012/0058382 A1* | 3/2012 | Carignan | H01M 2/206 429/158 |
| 2014/0302353 A1* | 10/2014 | Ogura | H01M 2/20 429/7 |

FOREIGN PATENT DOCUMENTS

| CN | 1568554 A | 1/2005 |
| CN | 1707829 A | 12/2005 |

(Continued)

OTHER PUBLICATIONS

TTI (Macao Commercial Offshore) Limited; International Patent Application No. PCT/CN2016/074731; International Search Report; dated Nov. 23, 2016; (2 pages).
(Continued)

*Primary Examiner* — Edward Tso
*Assistant Examiner* — Aaron Piggush
(74) *Attorney, Agent, or Firm* — Dority & Manning, P.A.

(57) ABSTRACT

A battery pack containing a frame; and two or more battery cells installed to the frame. The two or more battery cells are interconnected by a configurable connector which is configured to enable electrical connections between the two or more battery cells. The configurable connector is adapted to be configured in a first status or a second status. In the first status, the two or more battery cells are electrically connected, and in the second status, the two or more battery cells are not electrically connected. The battery pack is not fully operational without the terminal holder inserted, therefore before it is delivered to the end user the energy loss due
(Continued)

to self-discharging during storage and shipping can be minimized.

23 Claims, 16 Drawing Sheets

(51) Int. Cl.
  *H01M 50/543* (2021.01)
  *H01M 50/213* (2021.01)
  *H01M 50/502* (2021.01)
  *H01M 50/20* (2021.01)
  *H01M 50/103* (2021.01)

(52) U.S. Cl.
  CPC ......... *H01M 50/543* (2021.01); *H02J 7/0042* (2013.01); *H01M 50/103* (2021.01); *H01M 50/20* (2021.01); *H01M 2220/30* (2013.01)

(58) Field of Classification Search
  CPC ............. H01M 2/1016; H01M 50/502; H01M 50/543; H01M 50/103; H01M 50/213; H01M 10/425; H01M 2220/30
  USPC ......... 320/107, 112, 127, 163; 429/158, 178
  See application file for complete search history.

(56) References Cited

FOREIGN PATENT DOCUMENTS

| | | |
|---|---|---|
| CN | 101140984 A | 3/2008 |
| CN | 101662036 A | 3/2010 |
| CN | 101758488 A | 6/2010 |
| CN | 103098166 A | 5/2013 |
| CN | 104103799 A | 10/2014 |
| CN | 104953076 A | 9/2015 |
| TW | 447153 B | 7/2001 |
| TW | 200529532 A | 9/2005 |
| TW | M376916 | 3/2010 |
| TW | I453977 | 9/2014 |

OTHER PUBLICATIONS

TTI (Macao Commercial Offshore) Limited; European Patent Application No. EP16891051; Supplementary European Search Report; dated May 28, 2019; (3 pages).
Taiwanese Patent Application No. 106106386; Search Report dated Jan. 28, 2021.
Techtronic Cordless GP; Office Action for corresponding CN Patent Application No. 201680079666.8; dated Dec. 28, 2020; (12 pages).

* cited by examiner

BATTERY PACKS AND METHOD OF ASSEMBLING BATTERY PACKS

This application is a National Stage Patent Application of PCT/CN2016/074731, filed on Feb. 26, 2016, the disclosure of which is incorporated by reference herein in its entirety.

FIELD OF INVENTION

This invention relates to an electrical energy storage device, and in particular a battery pack containing multiple battery cells.

BACKGROUND OF INVENTION

Battery packs are commonly used in portable electrical equipment and tools, so that these equipment and tools can be used in environments where no fixed power supply is available. For example, power tools manufacturers often produce a universal power pack which can be compatibly used in different types of cordless power tools, such as electric drills, hammers, screwdrivers, angle grinder, etc. The battery packs usually consist of a plurality of battery cells accommodated in an integral housing where the user can easily install the entire battery into the power tool, or remove it therefrom via latching mechanisms configured on the battery pack housing.

However, traditional battery packs are often manufactured in the factory to a ready-to-use status, which means that the battery pack before leaving the factory for shipping or selling is fully assembled and operational. The end user upon receiving the battery pack may instantly plug the battery pack into an electric device to start using the electric device. The battery packs manufactured in this way no doubt provide convenience to the user as no extra setup step is required on the user's side before starting to use the battery pack. On the other hand, such battery packs suffer from the problem that once it is manufactured in factory, there will be self-discharging of the battery pack, which ultimately leads to energy loss of electrical power n the battery pack, and degrading of battery life.

SUMMARY OF INVENTION

In the light of the foregoing background, it is an object of the present invention to provide an alternate battery pack, as well as methods of manufacturing the battery packs and preparing the battery packs for use, which eliminate or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a battery pack which contains a frame and two or more battery cells installed to the frame. The two or more battery cells are interconnected by a configurable connector which is configured to enable electrical connections between the two or more battery cells. The configurable connector is adapted to be configured in a first status or a second status. In the first status, the two or more battery cells are electrically connected, and in the second status, the two or more battery cells are not electrically connected.

Preferably, the configurable connector further contains two terminals which are separated from each other and connected to one of the two or more battery cells respectively. The two terminals are not electrically connected and thus the configurable connector is in the second status, unless the two terminals are connected by an intermediate conductor by which the configurable connector becomes to be in the first status.

More preferably, the battery pack further contains the intermediate conductor detachably connected to the two terminals of the configurable connector.

In one implementation, the two terminals are metal clips arranged to be parallel with each other. The intermediate conductor contains a metal pin detachably inserted between the two metal clips so that the two terminals become electrically connected and the configurable connector becomes to be in the first status.

In one variation, the battery pack contains two or more configurable connectors. The intermediate conductors of the two or more configurable connectors are fixedly connected together.

In another variation, the battery pack further includes a dummy connector, which is detachably connected to the two terminals and causing the two terminals to be electrically insulated.

In a further variation, the intermediate connector is a dual-purposes connector which is adapted to either electrically connect the two terminals of the configurable connector, or not causing the two terminals to be electrically connected.

Preferably, the dual-purposes connector includes a conducting members and an insulating member which are symmetrically configured on two ends of the dual-purposes connector respectively.

In yet another variation, the battery pack contains two or more configurable connectors. The battery pack further contains two or more dummy connectors which are fixedly connected together.

According to one variation, the battery pack contains a circuit board to which the two terminals of the configurable connector are fixed.

According to another variation, the battery pack further contains a switch for controlling an electric circuit of the battery pack. The intermediate conductor is further connected with an actuating member adapted to trigger the switch. The switch is switched on or off as the intermediate conductor connects or disconnects from the two terminals.

Preferably, the switch is a push button.

More preferably, the battery pack further includes a circuit board on which the electric circuit is implemented. The switch is surface-mounted on the circuit board.

According to yet another variation, the battery pack further contains a housing accommodating the frame and the two or more battery cells. The housing further includes a portion which protects the two terminals of the configurable connector from accidental contact with external objects. The portion of the housing is formed with an opening which allows contact with the two terminals by the intermediate conductor.

According to another aspect of the present invention, there is provided a method of manufacturing a battery pack, which contains the steps of assembling the battery pack by installing two or more battery cells to a frame; and connecting the two or more battery cells by a configurable connector. The configurable connector further contains two terminals which are separated from each other. The two terminals are not electrically connected and the configurable connector is switched off, such that the two or more battery cells are not electrically connected.

Preferably, the two terminals are adapted to be connected by an external intermediate conductor whereby the configurable connector becomes switched on.

More preferably, the two terminals are two metal clips positioned in parallel. The intermediate conductor contains a metal pin, which is adapted to be received by the two metal clips when inserted between the two metal clips so that the two terminals become electrically connected.

In one variation, the two terminals are adapted to receive a dummy connector inserted therebetween, which does not cause the two terminals to be electrically connected.

In another variation, the battery pack further contains a circuit board to which the two terminals are fixed.

In a further variation, the intermediate connector is a dual-purposes connector which is adapted to either electrically connect the two terminals of the configurable connector, or not causing the two terminals to be electrically connected.

Preferably, the dual-purposes connector includes a conducting members and an insulating member which are symmetrically configured on two ends of the dual-purposes connector respectively.

In yet another variation, the battery pack further contains a housing accommodating the frame and the two or more battery cells. The housing further contains a portion which covers the two terminals of the configurable connector from accidental contact with external objects. The portion of the housing is formed with an opening which allows contact with the two terminals by the intermediate conductor.

According to a further aspect of the present invention, there is provided a method for pulling a battery pack to work, which contains the step of preparing a battery pack which contains a frame and two or more battery cells installed to the frame. The two or more battery cells are interconnected by a configurable connector, which further contains two terminals which are separated from each other and not electrically connected, such that the two or more battery cells are not in electrically connected. The method further contains the step of connecting the two terminals of the conductive connector by an intermediate conductor whereby the configurable connector becomes switched on and the two or more battery cells become electrically connected.

Preferably, the two terminals are metal clips positioned in parallel. The intermediate conductor contains a metal pin detachably inserted between the two metal clips so that the two terminals become electrically connected.

In one implementation, the battery pack further contains a dummy connector detachably connected to the two terminals and causing the two terminals to be electrically insulated. The method further includes the step of disconnecting the dummy connector from the configurable connector prior to the connecting step.

In a further variation, the intermediate connector is a dual-purposes connector which is adapted to either electrically connect the two terminals of the configurable connector, or not causing the two terminals to be electrically connected.

Preferably, the dual-purposes connector includes a conducting members and an insulating member which are symmetrically configured on two ends of the dual-purposes connector respectively.

In one variation, the battery pack further contains a circuit board to which the two terminals are fixed.

In another variation, the battery pack further contains a switch for controlling an electric circuit of the battery pack. The intermediate conductor further connected with an actuating member adapted to trigger the switch. The switch is switched on in the connecting step as the intermediate conductor connects to the two terminals.

Preferably, the switch is a push button.

More preferably, the battery pack further contains a circuit board on which the electric circuit is implemented; the switch being surface-mounted on the circuit board.

In yet another variation, the battery pack further contains a housing accommodating the frame and the two or more battery cells. The housing further includes a portion which covers the two terminals of the configurable connector from accidental contact with external objects. The portion of the housing is formed with an opening which allows contact with the two terminals by the intermediate conductor.

There are many advantages to the present invention. The battery pack according to the present invention is not fully functional when it is manufactured in the factory. Such non-functional status continues during the storing, transporting, selling of the battery pack, and even when the consumer who bought the battery pack together or separately from the electric tool that is intended to be used together with the battery pack stores the battery pack in his premise without unpacking. The time when the battery pack becomes operational is when the user inserts the conductive terminal holders into the respective terminals, which leads to closing of the circuit within the battery pack and then the battery pack become ready to use. Therefore, before the terminal holder is installed, the electrical circuit in the battery pack is actually not completed, or say "closed", and in this way there will be much less self-discharging effect due to the internal circuit connecting the plurality of battery cells together. On the other hand, it is easy and convenient for the user to prepare the battery pack for use since he/she only needs to simply insert the terminal holder between the metal clips of the terminals, which would not cause any difficulties to ordinary users.

A further advantage of the present invention is that an internal wall is configured between the outside environment and the metal clips on the circuit board, which functions to protect the metal clips from the outside environment, therefore eliminates short or safety issues due to the two or more terminals accidently connected by an external object such as the user's finger. To operate the configurable connector, only the dedicated terminal holder can be inserted into the internal wall with its metal pins. To further prevent short circuit or harms to the user, a dummy holder is used in place of the terminal holder which helps to insulate two metal clips of a configurable connector. Even more, to further prevent accidental activation of the battery pack's circuit, a switch button is provided such that only the dedicated terminal holder with an actuating member is able to trigger the switch, in order to enable the electrical circuit in the battery pack.

BRIEF DESCRIPTION OF FIGURES

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims. "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
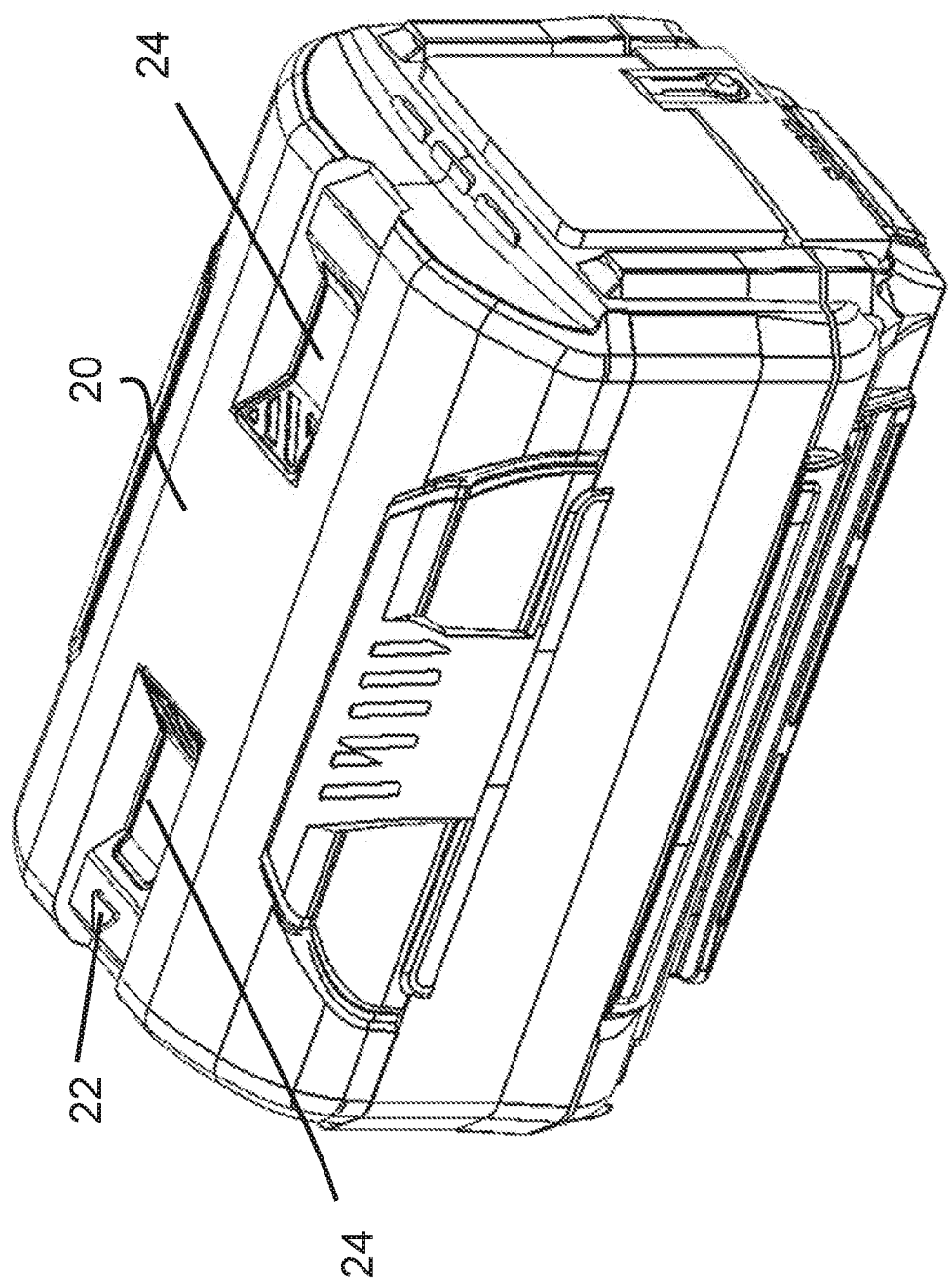
FIG. 1 shows the overall appearance of a battery pack according to a first embodiment of the present invention.
Figure 2:
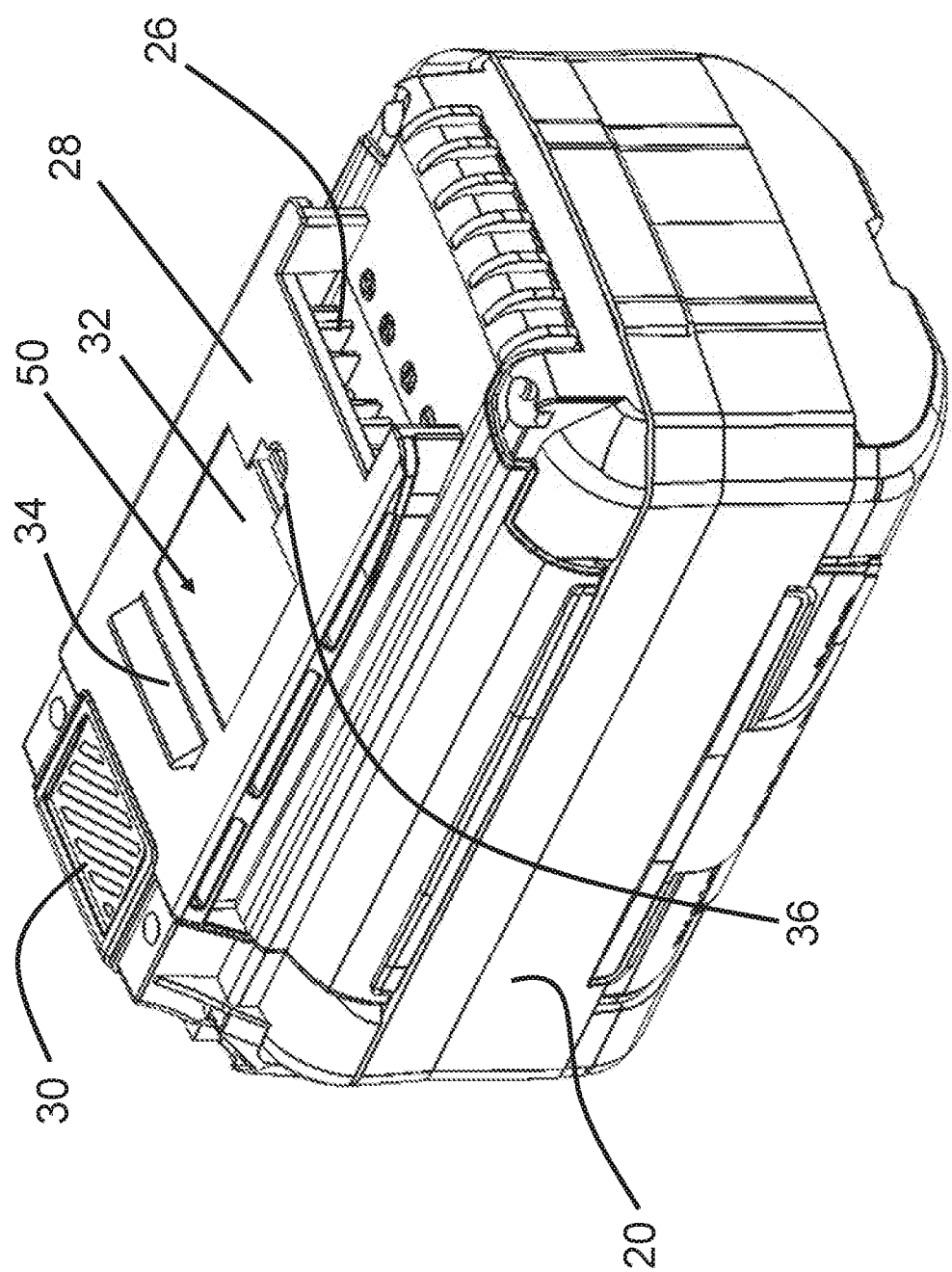
FIG. 2 is the perspective view of the battery pack in FIG. 1 from another viewing angle.

Referring now to FIGS. 1 and 2, the first embodiment of the present invention is a battery pack which can be used in outdoor electric tools including electric garden tools. The battery pack contains a housing 20, which accommodates internal components of the battery pack including a plurality of battery cells (not shown), battery frames supporting these battery cells, and a control circuit board of the battery pack (not shown). The housing 20 exhibits a special shape which is made in accordance with the dimension of the battery receptacle (not shown) on the aforementioned electric tools, as those skilled in the art would understand. FIG. 1 shows the front side of the battery pack, where an indication 22 showing the correct battery inserting direction is made on the housing. There are also recesses 24 provided on the housing 20 for the user to easily move the battery to slide in or out from the battery receptacle.

FIG. 2 shows the back of the battery pack, where the battery pins 26 and the latching mechanism for fixing the battery pack in the battery receptacle of the electric tool are located. The battery pins 26 are concealed under a protruded part 28 of the battery housing 20, so that the battery pins 26 can only be physically contacted by corresponding terminals (not shown) on the charger or the electric tool when the battery pack is inserted into the battery receptacle of the electric tool or the charger. The latch mechanism includes an unlocking lever formed with a pressing area 30 on its one end and a post 34 on its other end. The unlocking lever is normally biased by a resilient means (not shown) so that the post 34 is extending beyond the surface of the protruded part 28. The post 34 therefore keeps the battery pack in the battery receptacle once it is installed, where the post 34 snap fits into a corresponding recess structure (not shown) in the battery receptacle. To remove the battery pack from the battery receptacle the user presses on the pressing area 30 and as a result the post 34 retreats back into the protruded part 28 and thus the battery pack is unlocked.

On the protruded part 28, there is also a terminal holder 32 which is used to enable/disable the internal electrical circuit of the battery pack. The electrical connection of the terminal holder 32 will be introduced in more details later. The end plate 50 of the terminal holder 32 when installed in battery pack is flush with the surface of the protruded part 28 of the housing 20. Also, the terminal holder 32 is made a separate piece from the battery pack housing 20 so that the terminal holder 32 can be removed from the battery pack housing 20. There is a snap-fit joint 36 at an end of the terminal holder 32 for the user to lift up the terminal holder 32 from the surface of the protruded part 28 and then remove the terminal holder 32.

Figure 3:
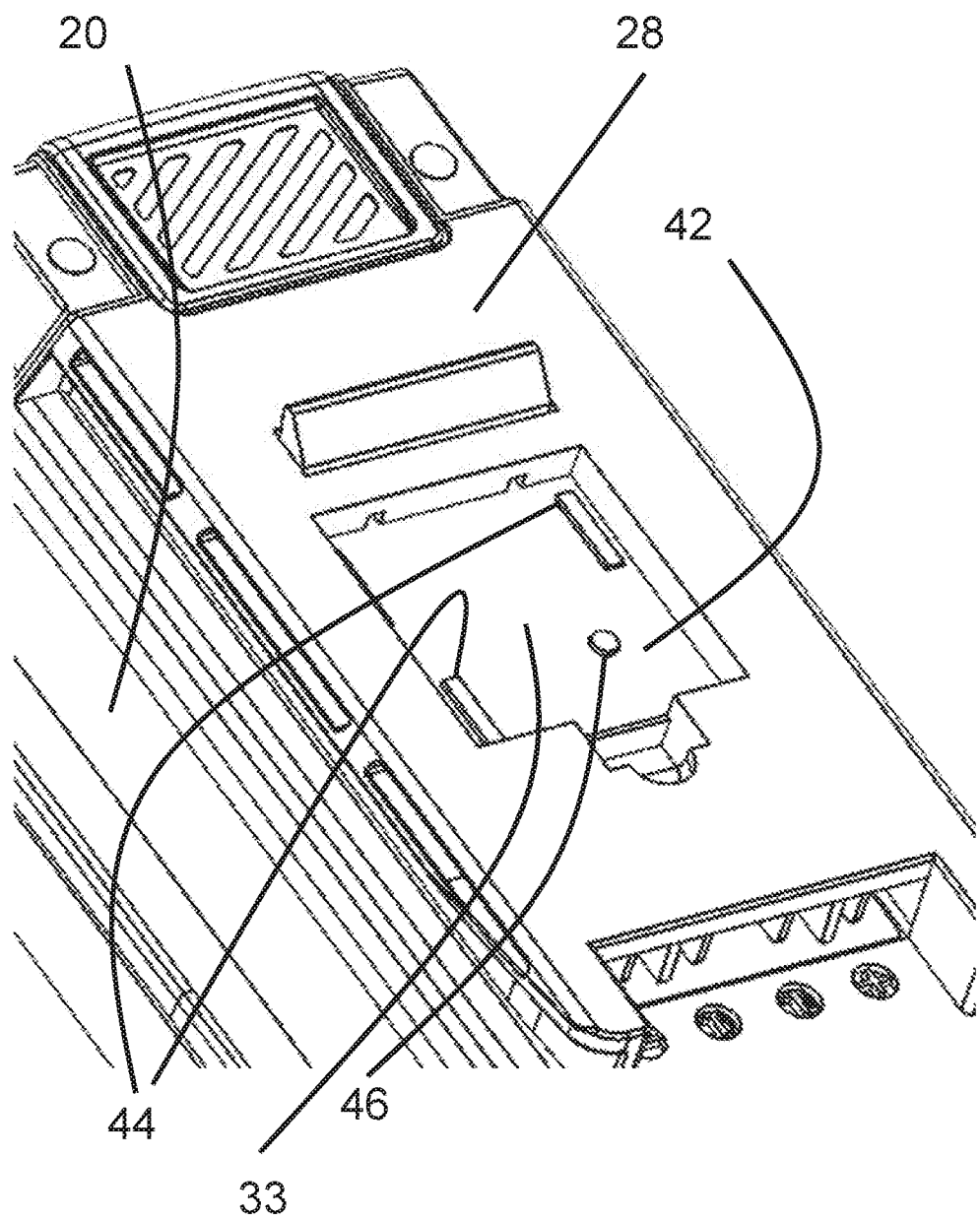
FIG. 3 shows the protruded part of the housing of the battery pack in FIG. 1, where no terminal holder or dummy holder is inserted in the battery pack.

FIG. 3 shows the protruded part 28 of the housing 20 where the terminal holder is removed, and that the recess 33 which would have been occupied by the terminal holder is revealed. There is an internal wall 42 underneath the terminal holder when the latter is installed on the batter pack. The internal wall 42 is made as a single piece with the protruded part 28 and in turn the battery housing 20. The internal wall 42 is lower the surrounding surface of the protruded part 28 so that the recess 33 is formed. The internal wall 42 is configured to protect terminals in the configurable connectors and in fact the circuit board (both not shown) inside the battery pack from the outside environment. Objects like the user's fingers cannot contact the circuit board with the presence of the internal wall 42. However, there are several openings including three elongated slots 44 (only two are shown in FIG. 3) and a round orifice 46 formed on the internal wall 42. The slots 44 correspond to locations of the three configurable connectors and the orifice 46 corresponds to the location of a surface-mount switch (not shown) on the circuit board. Through these elongated slots 44 and the round orifice 46, intermediate conductors and actuating members on the terminal holder will be able to physically contact the configurable connectors and the surface-mount switch even if the internal wall is present. The structure of the terminal holder and its installation process will be described in more details below.

Figure 4:
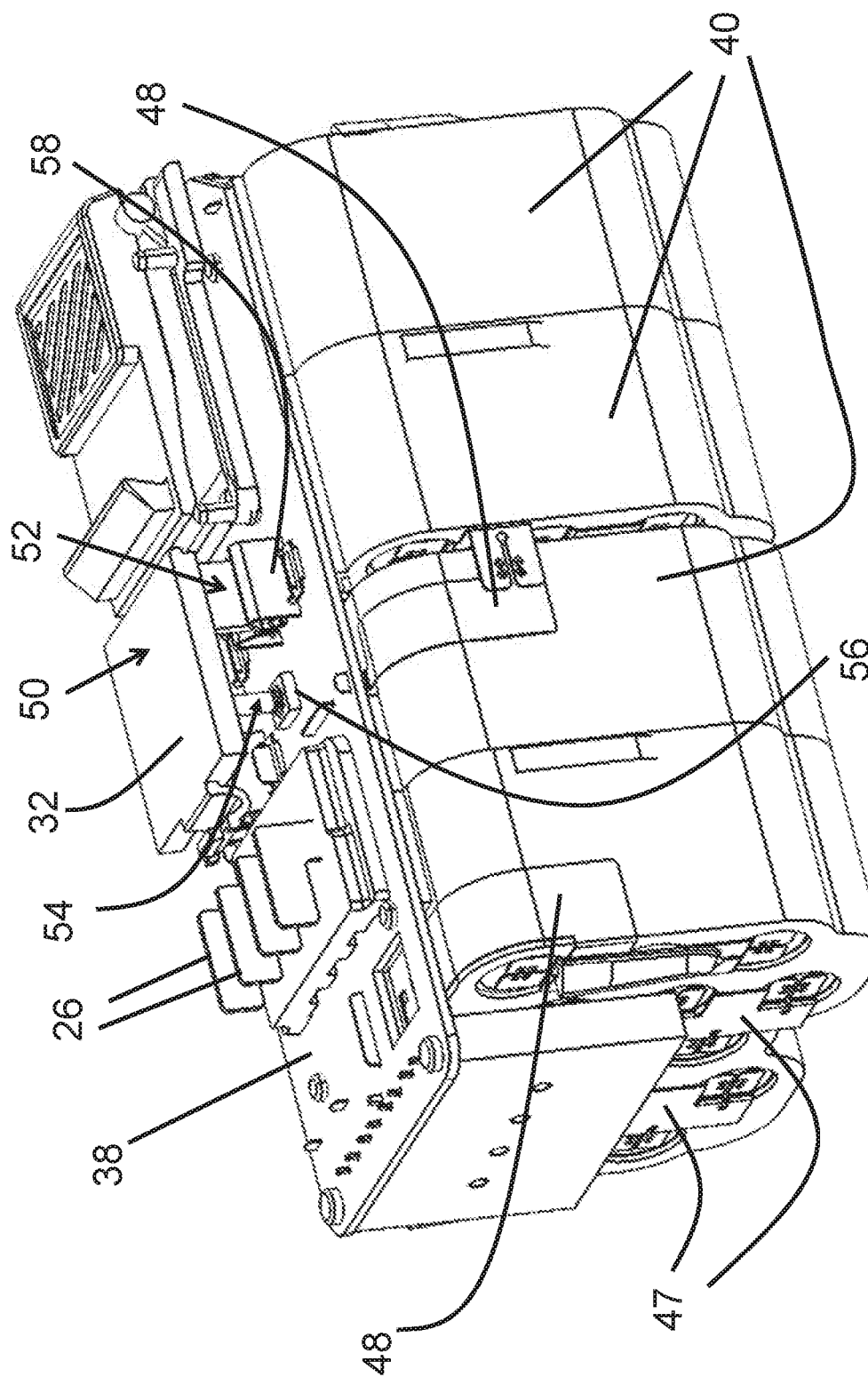
FIG. 4 shows the battery pack in FIG. 1 with the battery housing removed to expose the circuit board and the battery frames.
Figure 5:
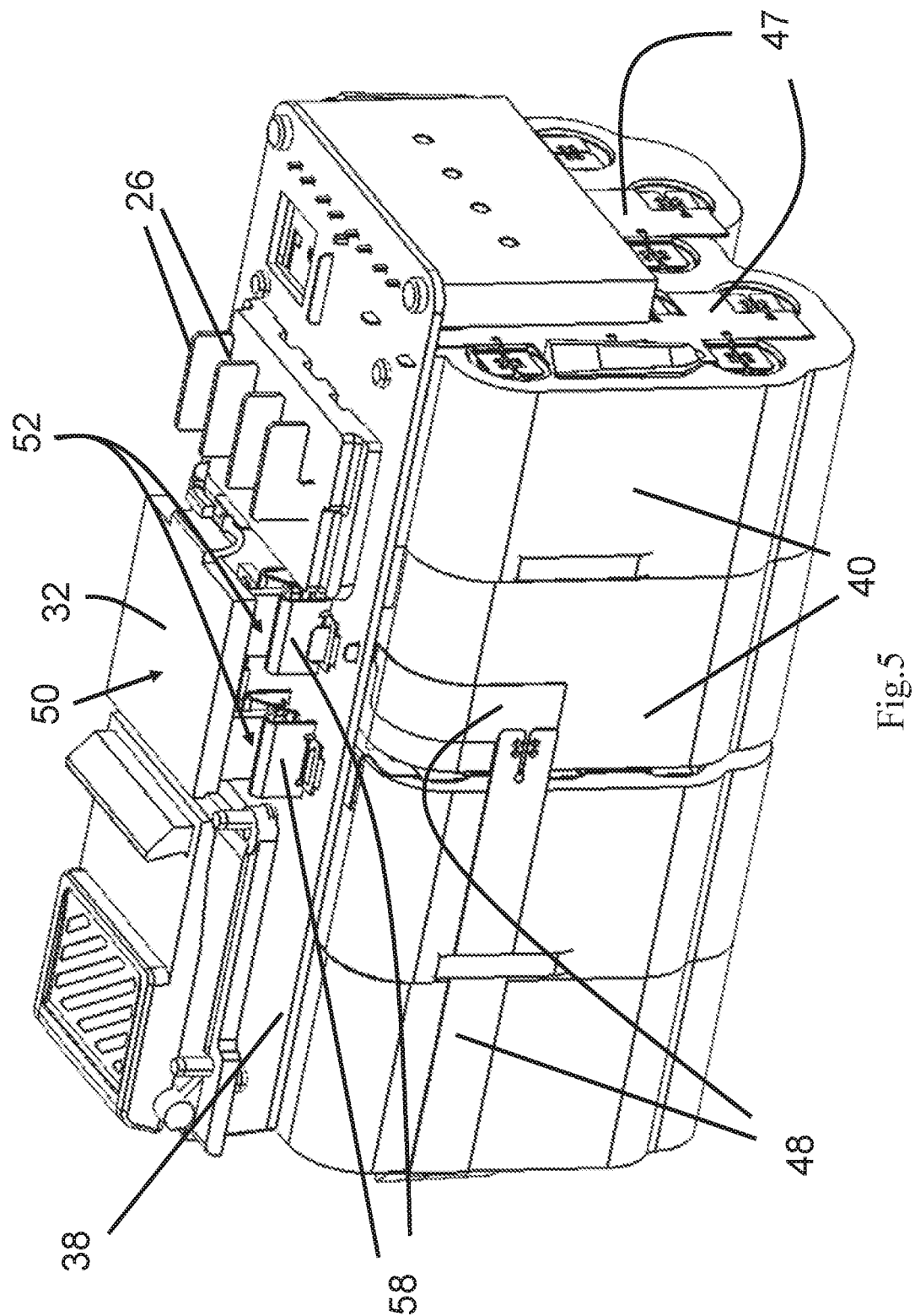
FIG. 5 is the perspective view of battery pack in FIG. 4 from another viewing angle.
Figure 6:
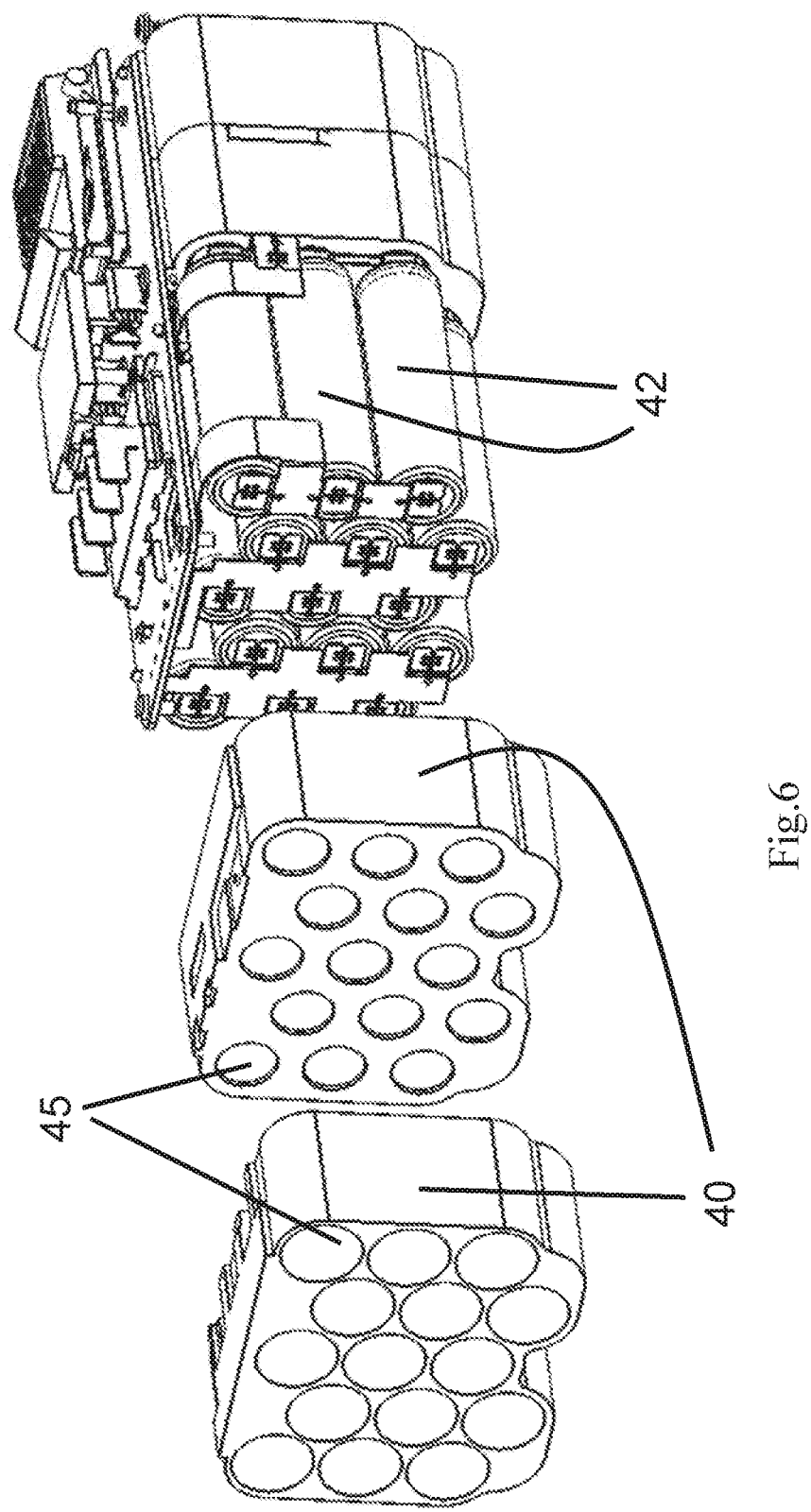
FIG. 6 is a partially exploded view of the battery pack in FIG. 1 where two of the four frames are moved apart from other components including the battery cells they are containing.

Referring now to FIGS. 4-6, the battery pack described above is shown with its housing removed to reveal the frames 40 and the circuit board 38 of the battery pack. In these figures the terminal holder 32 is also illustrated to have been installed on the circuit board 38. There are four frames 40 in the battery pack to which the individual battery cells 42 are installed. The four frames 40 are align substantially in a head-to-tail manner which together forms an elongated shape of the battery pack. Each frame 40 contains a plurality of thorough holes 45 where each such thorough hole 45 is used to accommodate one battery cell 42. The battery cell 42 has a cylindrical shape. Multiple battery cells 42 in the same frame 40 are connected by metal strips 47 so as to connect the battery cells 42 in parallel. In addition, battery cells 42 across different frames 40 are connected by connecting bars 48 which extend along the exterior surface of the frames 40. The connecting bars 48 are made of thin metal strips, which have shapes closely fitting the exterior shape of the portions of frames 40 along which the connecting bar 48 extends. Each connecting bar 48 extends from an end of a frame 40 to the circuit board 38, where the battery cells 42 in different frames 40 are electrically connected to each other at the circuit board 38, subject to the status of the configurable connectors. One will see that some of the connecting bars 48 have a bent shape. The aforementioned battery pins 26 are placed on the circuit board 38 and electrically connected to the circuit board 38. Among the four battery pins 26, there is a positive pin, a negative pin, a first signal pin, and a second signal pin.

As will be explained below, the configurable connectors can be switched between a first status and a second status, which ultimately control electrical connections between the different battery cells 42. The first status is when the configurable connector is switched on, and the second status is when the configurable connector is switched off.

The structure of the terminal holder 32 and the configurable connector on the circuit board 38 will now be described. The terminal holder 32 has an end plate 50 as mentioned above, the top surface of which is designed to be flush with the exterior shape of the battery housing in order to form a smooth appearance. On the other side of the end plate 50, there are three intermediate conductors 52, and an actuating member 54, which are substantially connected to the four corner positions of the end plate 50. The intermediate conductors 52 and the actuating member 54 therefore extend from the end plate 50 to the circuit board 38 when the terminal holder 32 is installed. The intermediate conductor 52 is a metal pin in a thin plate shape. The shape of the intermediate conductor 52 allows it to be inserted between the two metal clips 58 of each configurable connector on the circuit board 38. The actuating member 54 is a rod-like rigid component which is used to actuate the surface-mount switch 56 on the circuit board. Due to the end plate 50, all three intermediate conductors 52 and the actuating member 54 are fixedly connected. The surface-mount switch 56 is a part of the internal electrical circuit of the battery pack and controls the on/off the electrical circuit.

Figure 7:
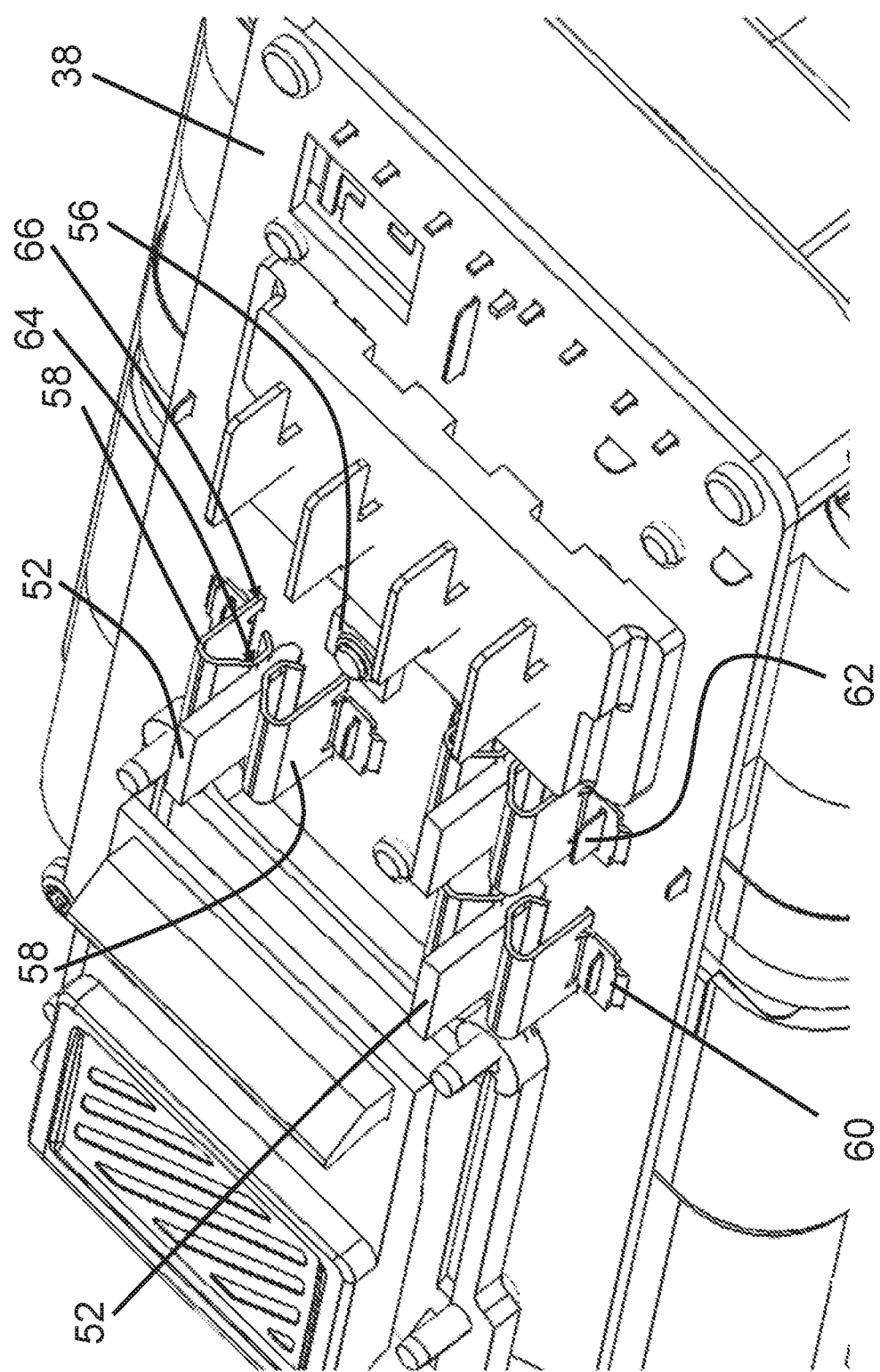
FIG. 7 illustrates the surface of the circuit board in the battery pack of FIG. 1, with the metal pins of the terminal holder inserted between the metal clips of the configurable connectors.
Figure 8:
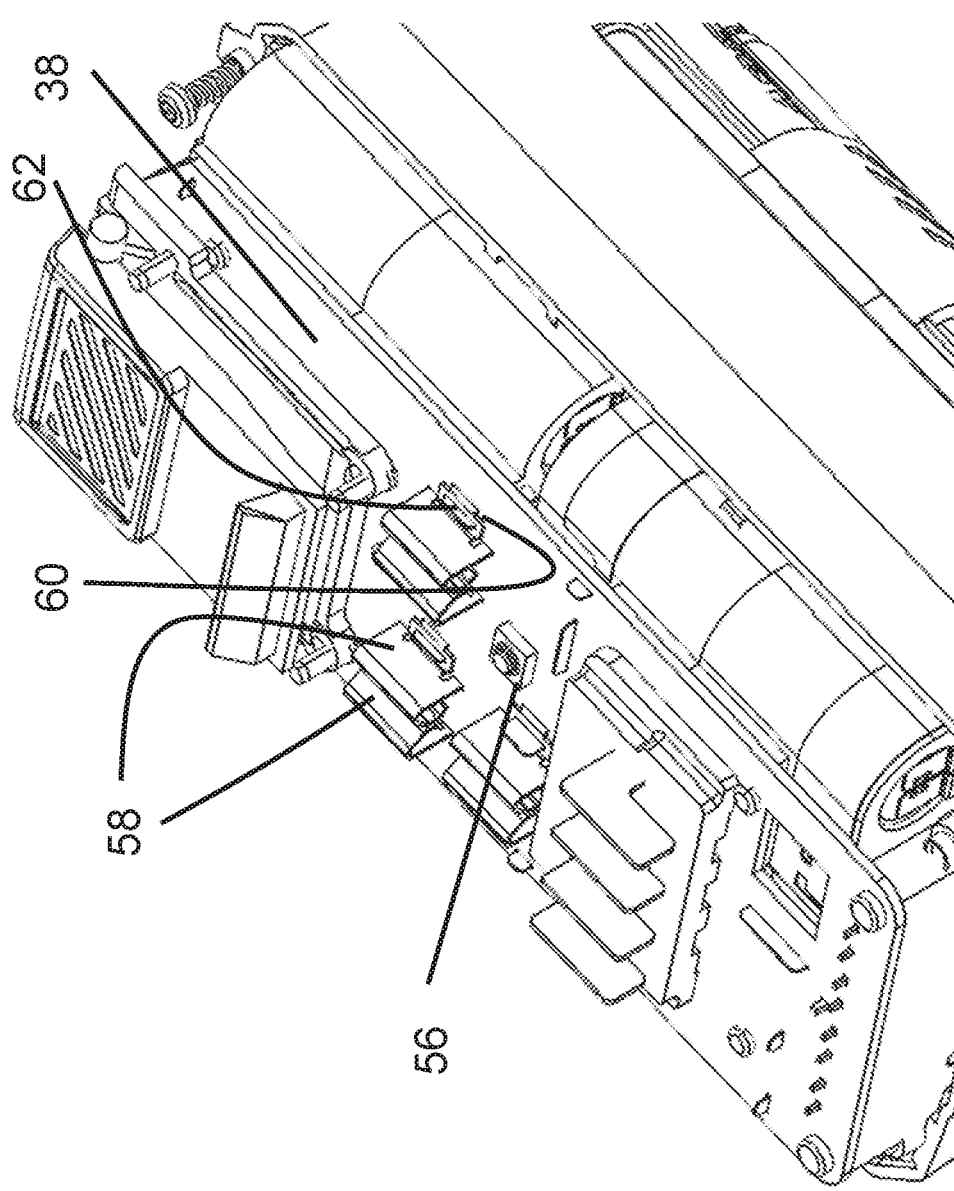
FIG. 8 also illustrates the surface of the circuit board in the battery pack of FIG. 1, but with nothing inserted between the metal clips of the configurable connectors.

FIGS. 7 and 8 show the metal clips 58 of the configurable connectors in more details. The surface-mount switch 56 is also shown in the two figures. Among the figures, FIG. 7 shows metal clips 58 in which the intermediate connector 52 is inserted (although the end plate of the terminal holder is not shown), and FIG. 8 shows metal clips 58 without the intermediate connector inserted therein. For each configurable connector, the two metal clips 58 are aligned to be in parallel to each other, and both extend upward from the circuit board 38. The metal clips 58 are also referred as terminals of each configurable connector. Each metal clip 58 is bent into a hook shape with a bent end 64 and a flat end 66. The bent end 64 of the metal clip 58 is used for physically contacting with the intermediate conductor 52, and since the metal clip 58 is made of thin metal, the bent end of the metal clip 58 is resilient which allows the intermediate conductor 52 to squeeze in but not easily falls out without applying an external force on the intermediate conductor 52. On the flat end 66 of each metal clip 58, there is formed a tab 60 which is made to be parallel with the surface of the circuit board 38. Each tab 60 is used to connect to a strap 62 of a connecting bar (not shown). The strap 62 is welded to a corresponding tab 60, thus enabling electrical connection from the metal clip 58 to its tab 60, the strap 62, and in turn the electrical circuit of the battery pack.

Figure 9A:
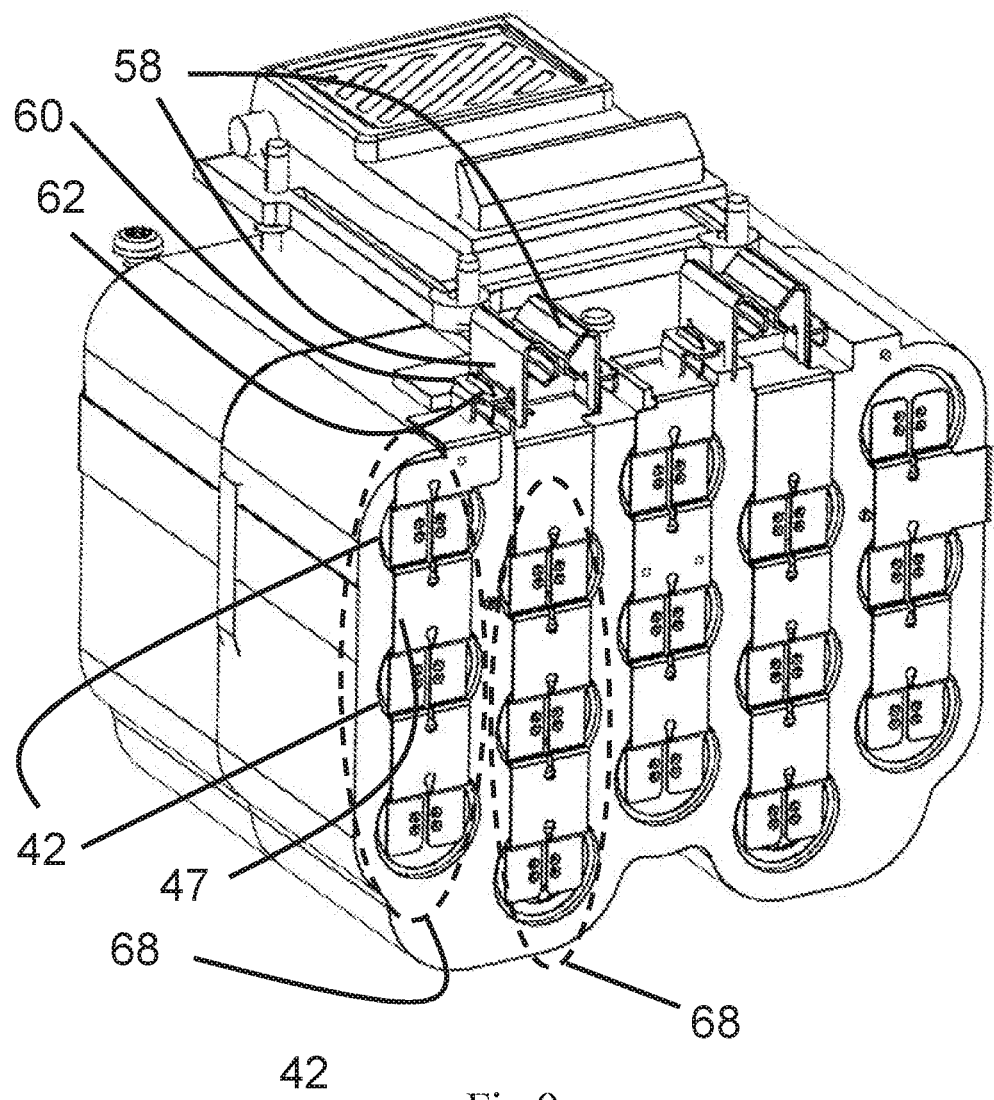
FIG. 9a is a cross-sectional view of a first half of the battery pack in FIG. 1 with the battery housing removed, which shows the battery sets and their connections to the metal clips.
Figure 9B:
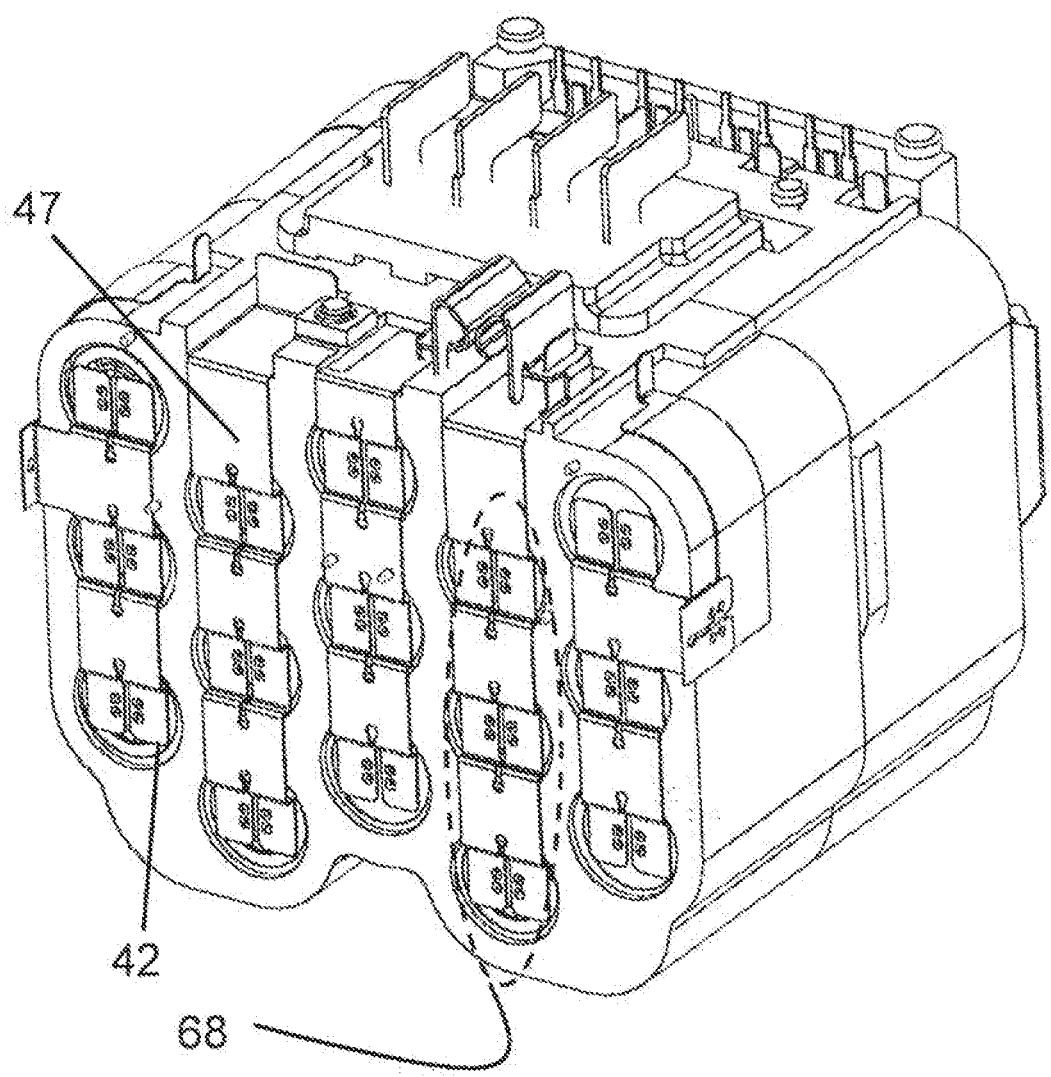
FIG. 9b is a cross-sectional view of a second half of the battery pack in FIG. 1 with the battery housing removed, which shows the battery sets and their connections to the metal clips.

Turning now to FIGS. 9a and 9b, all the battery cells 42 in the battery pack are connected in groups to form ten battery sets in total. Each battery set 68 contains three battery cells 42 connected in parallel by metal strips 47. Therefore, ideally each battery set 68 in FIGS. 9a and 9b provide the same output voltage which is the voltage of a single battery cell 42, but the current outputted by the battery set 68 is three times of that outputted by a single battery cell 42. In FIG. 9a there are five such battery sets 68 shown, and in FIG. 9b there are another five such battery sets 68. For each metal clip 58 in a configurable connector, it is connected to one battery set 68. For example, in FIG. 9a the leftmost battery set 68 is connected to the leftmost metal clip 58. For this battery set 68, a metal strip 47 has an end on which the above mentioned strap 62 is formed, and then the strap 62 is connected to the tab 60 of the corresponding metal clip 58. Since there are only three pairs of metal clips 58 but there are ten battery sets 68, this would mean that not every battery set 68 is directly connected to a configurable connector.

Figure 10:
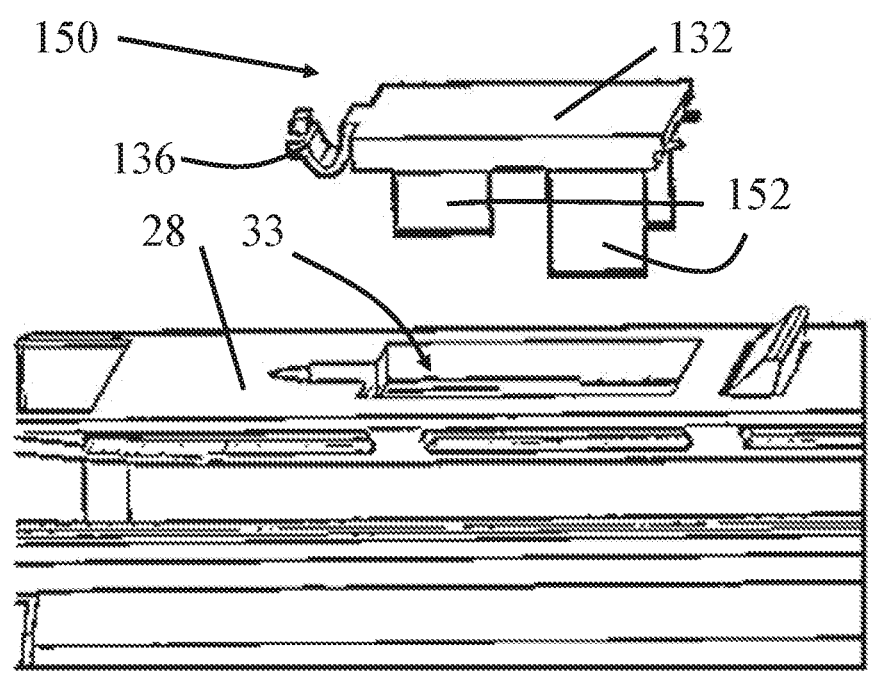
FIG. 10 shows a dummy connector which is adapted to be inserted into the recess on the battery housing of the battery pack in FIG. 1.

Optionally, the battery pack described above also contains a dummy holder 150 which has a shape similar to the terminal holder 50 but contains no intermediate conductors. The dummy holder 150 is intended as a separate piece of component to be used together with the battery pack. The dummy holder 150 is shown in FIG. 10, which contains three dummy connectors 152 which are used to insert into the metal clips of the configurable connectors (not shown) to provide electrical insulation between two adjacent metal clips since the dummy connectors 152 are made of insulating materials. The dummy holder 150 can be inserted into the recess 33 of the protruded part 28 of the battery housing. The three dummy connectors 152 are connected to an end plate 132 of the dummy holder 150. The end plate 132 is also formed with a snap-fit joint 136 at an end of the dummy holder 150 for the user to lift up the terminal holder 150 from the surface of the protruded part 28 and then remove the dummy holder 150. Note that unlike the terminal holder described above, there is no actuating member in the dummy holder for triggering the surface-mount switch since the switch is not supposed to be triggered in any event when using a dummy holder.

Therefore, the configurable connector described above can be switched between a first status and a second status, depending on whether the terminal holder is inserted, or whether the dummy holder or otherwise nothing is inserted. In the first status of the configurable connector, the terminal holder is inserted into the configurable connector so that the metal plugs are electrically connected by the intermediate conductor in the terminal holder, and the configurable connector is switched on. The circuit segment containing the configurable connector is then closed and electrically connected. On the other hand, in the second status of the configurable connector, the dummy holder is inserted into the configurable connector, or actually nothing is inserted into the configurable connector, so that the metal plugs are not electrically connected. The configurable connector is switched off. The circuit segment containing the configurable connector is then open and not electrically connected.

Figure 11:
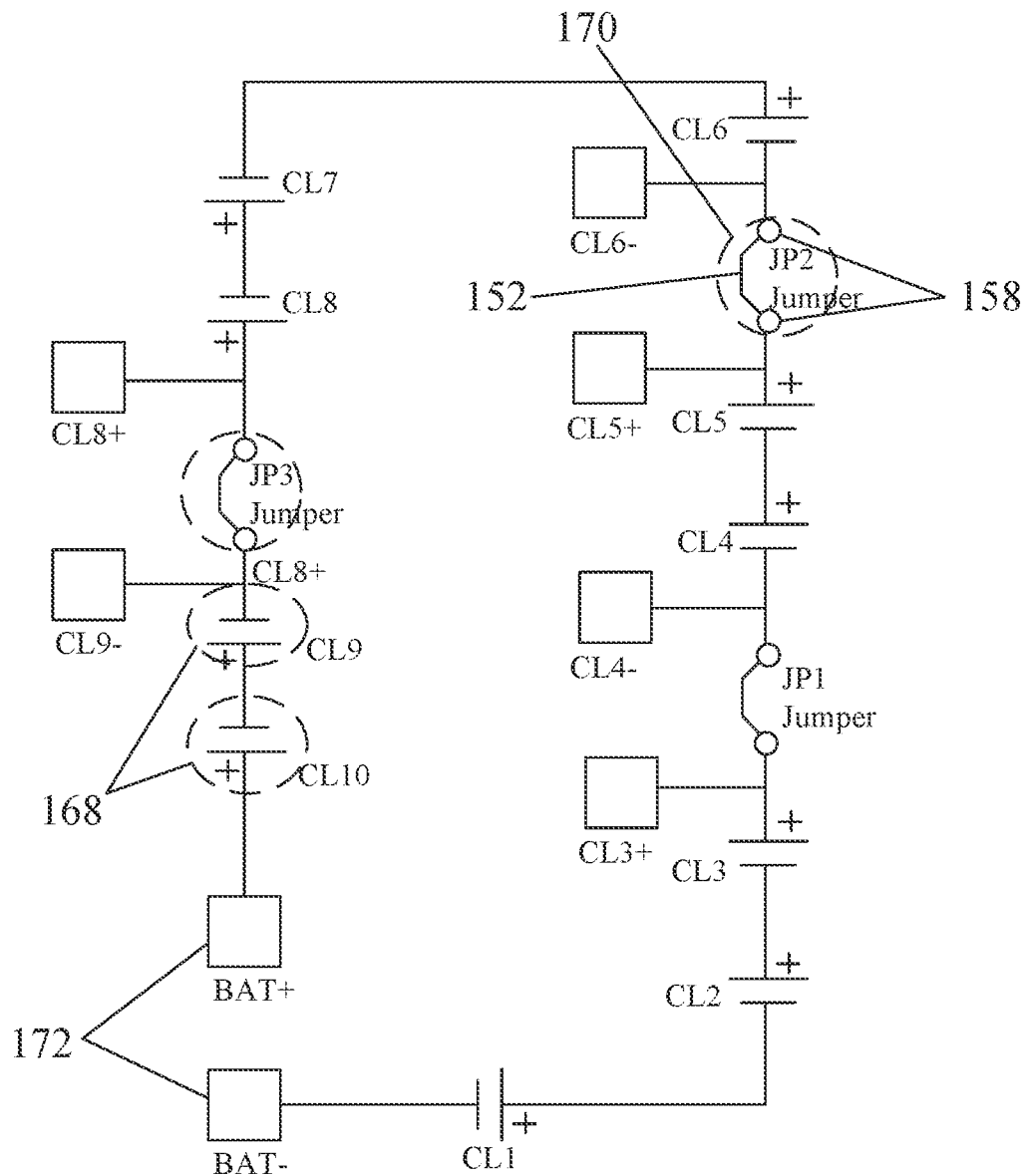
FIG. 11 is the schematic diagram of the electrical circuit inside the battery pack according to one embodiment of the present invention.

The simplified schematic diagram in FIG. 11 in turn shows how ten battery sets 168 can be electrically connected with the three configurable connectors 170 for a battery pack similar to the one shown in FIGS. 1-9b. In the schematic diagram, all the battery sets 168 are effectively connected in series although among some of the connections between the battery sets 168 the configurable connectors 170 are present. Each configurable connector 170 contains two terminals 158, such as the metal clips as described previously, and an intermediate conductor 152. The three configurable connectors 170 are designated as jumpers JP1, JP2 and JP3 in the circuit diagram, and the ten battery sets 168 are designated as battery sets CL1 to CL10 respectively. The two battery pins 172 are the output of the battery pack which provides power or receives power from an external device such as an electric tool, or a battery charger.

Now turning to the manufacturing and assembling methods of the battery pack described above, FIG. 12 shows how the battery pack according to the present invention may be manufactured in factory prior to shipping and delivering to the end user. The most important feature of such manufacturing method compared to prior art is that once the battery pack manufactured, it is not ready for normal operation yet since the configurable connectors are not in a switched-on status. The battery pack only becomes operable when the user changes the configurable connectors to the switched-on status by inserting the terminal holder into the battery pack. Taking the battery pack illustrated in FIGS. 1-9b as an example, the manufacturing method starts at Step 172, where all the battery cells that are to be assembled in the battery pack are prepared, and in the example of FIGS. 1-9b the number of required battery cells would be thirty. Next, in Step 174 the battery cells are assembled into the battery frames similar to those described above. Three battery cells in a column to be formed as one battery set, and these battery cells are also connected on their poles by metal strips in this step. Then, in Step 176 the four battery frames are assembled together by welding. After the battery frames are assembled, the circuit board is connected to the battery frames and that necessary connecting bars are implemented along the exterior surface of the battery sets to connect the bandy sets to each other and also to the circuit board. The connecting bars are sometimes welded together in order to extend from one battery set to another or to change it extending direction (e.g. a bent shape). Also, for some of the connecting bars their ends will be electrically connected to the metal clips in the configurable connectors similar to those described above. Up to this step, the core part of the battery pack is manufactured and that its internal electrical circuit is assembled. In Step 180, the battery housing will be assembled so that the whole battery pack is made into its final appearance. Although the battery housing provides an internal wall as described above to protect the metal terminals of the configurable connectors from accidental short-circuiting or safety issue to the user, in Step 182 the dummy holder is inserted as an additional protection means and this dummy holder would completely insulate the two metal terminals in a configurable connector from each other and also from the outside environment. The manufacturing process of the battery pack is then completed in Step 184, and it is ready to be shipped and sold to end users.

Figure 13:
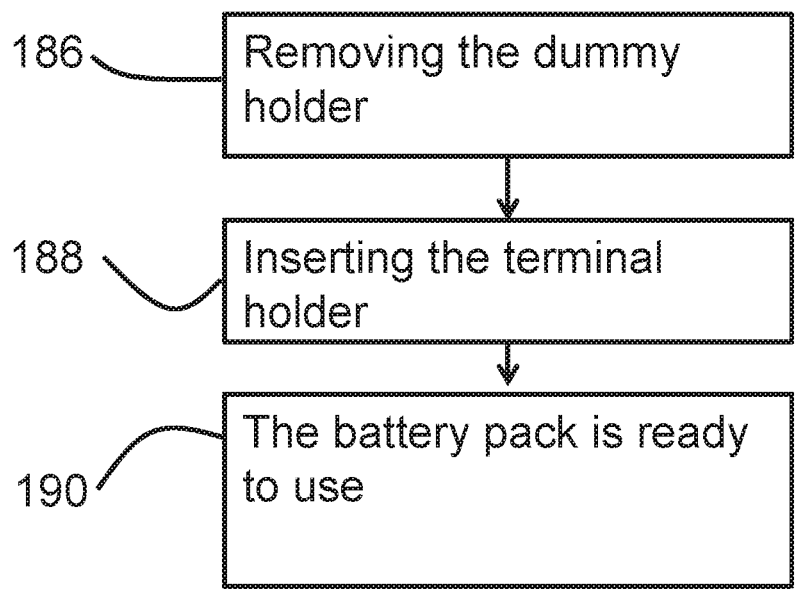
FIG. 13 is the flow chart showing the steps of putting a battery pack to work according to another embodiment of the present invention.

When the end user purchased or otherwise received the battery pack, he/she only has to perform a simple setup process to make the battery pack operational. As shown in FIG. 13, the user in Step 186 firstly needs to remove the dummy holder that came along with the battery pack to the end user. Removal of the dummy holder does not instantly make the battery pack ready to work, but the user still needs to insert the terminal holder into the battery pack which electrically connects all the configurable connectors and also activates the switch button on the circuit board of the battery pack in Step 188. Once the terminal holder is inserted, then the electrical circuit in the battery pack is completely closed and the battery pack is ready to use in Step 190.

Figure 14:
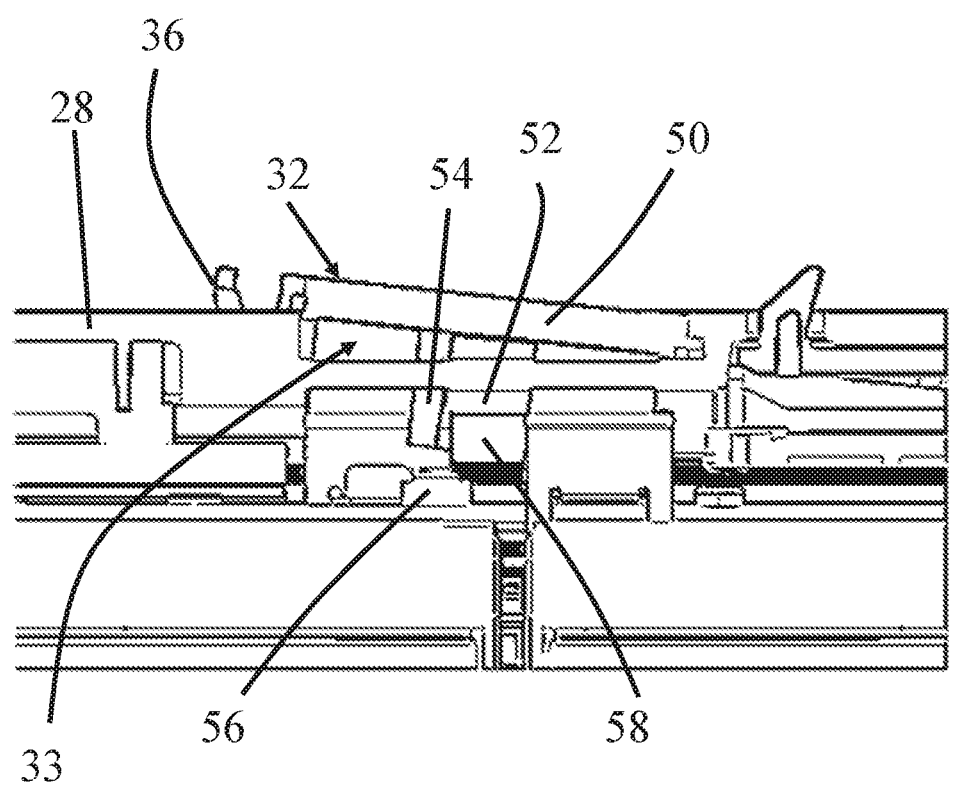
FIG. 14 shows an intermediate connector which is about to be installed in place in the recess on the battery housing of the battery pack in FIG. 1.

FIG. 14 shows how the terminal holder 32 may be inserted into the protruded part 28 of the battery pack housing in order to activate the battery pack internal circuit in Step 188 above. The terminal holder 32 is not inserted into the recess 33 of the protruded part 28 along a straight-line direction. Rather, an end of the end plate 50 of the terminal holder 32 is firstly pressed against a corresponding end of the recess 33. The terminal holder 32 is then rotated around that end (in a counterclockwise direction in FIG. 14), in the process which the intermediate connectors 52 are inserted into their respective metal clips 58 of the configurable connector, and the actuating member 54 engages the surface-mount switch 56. As the snap-fit joint 36 finally enters the recess and locks the terminal holder 32 due to the elasticity of the snap-fit joint 36, the terminal holder 32 is finally installed in the battery pack.

Figure 15A:
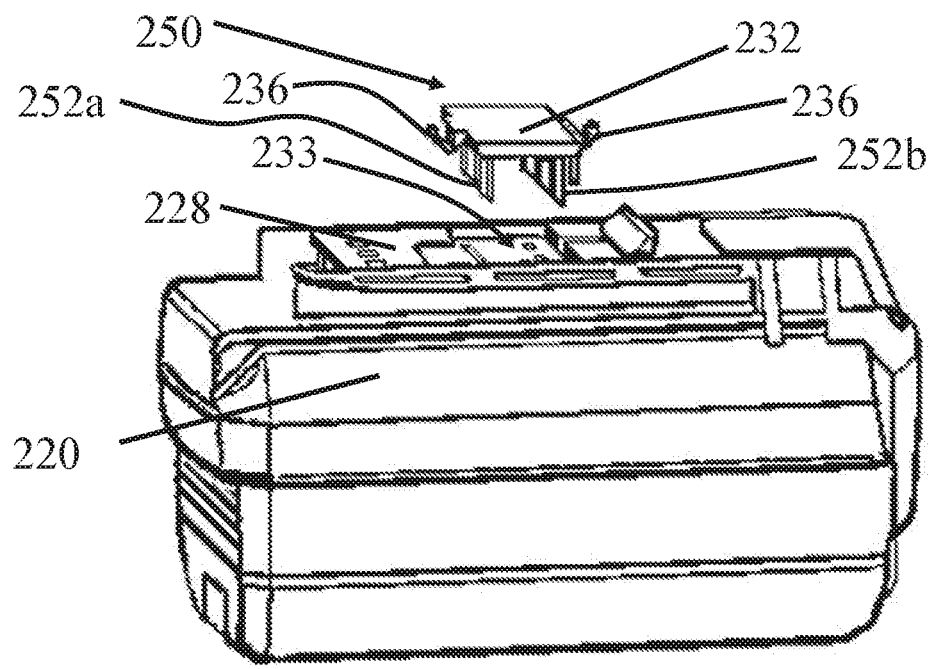
FIG. 15a shows a battery pack together with a dual-purposes terminal holder oriented in a working direction according to another embodiment of the present invention.
Figure 15B:
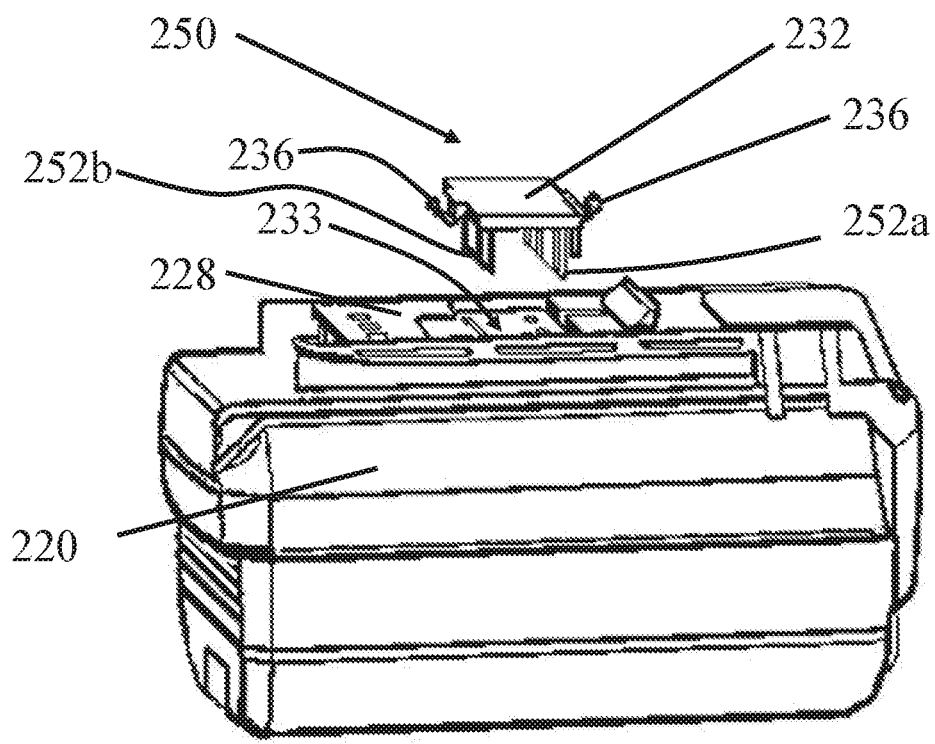
FIG. 15b shows the battery pack together with the dual-purposes terminal holder in FIG. 15a, but the dual-purposes terminal holder oriented in an inactivated direction.

FIGS. 15a and 15b show a battery pack with a single, dual-purposes terminal holder according to a further embodiment of the present invention. Instead of having separately a terminal holder and a dummy holder for activating and deactivating the internal circuit of the battery pack respectively as those shown in FIGS. 4-5 and 10, in this embodiment a single piece of component can be used both as the terminal holder which activates the battery circuit, and as a dummy holder which deactivates the battery circuit and prevents it from accidently short-circuiting. FIGS. 15a and 15b show the battery pack with a dual-purposes terminal holder 250 adapted to be inserted into a recess 233 formed on a protruded part 228 of the battery housing 220. The dual-purposes terminal holder 250, similar to the terminal holders and dummy holders described above, is made as a separate part which is removable from the battery housing. The dual-purposes terminal holder 250 has a substantially symmetrical shape on its two ends on which the dummy connectors 252b and the intermediate connectors 252a are configured. Both ends of the dual-purposes terminal holder 250 are formed with snap-fit joints 236. The intermediate connectors 252a are made of conductors such as metal materials, and the dummy connectors 252b are made of insulating materials such as plastics. When the dual-purposes terminal holder 250 is inserted into the recess 233 with its orientation as shown in FIG. 15a, the dummy connectors 252b are inserted into metal clips of each configurable connector (not shown) in the battery pack, while the intermediate connectors 252a are inserted into some other holes formed on the battery housing 220 which do not connect to any other component. In this way, the dual-purposes terminal holder 250 is used as a safety protection means which would completely insulate the two metal terminals in a configurable connector from each other and also from the outside environment. However, when the dual-purposes terminal holder 250 is inserted into the recess 233 with its orientation as shown in FIG. 15b, then the positions of the dummy connectors 252b and intermediate connectors 252a are swapped. The intermediate connectors 252a are now inserted into metal clips of each configurable connector (not shown) in the battery pack, while the dummy connectors 252b are inserted into sonic other holes formed on the battery housing 220 which do not connect to any other component. In this way, the dual-purposes terminal holder 250 is used as just as a conducting part similar to the terminal holder mentioned previously, which would close the internal circuit of the battery pack and enables the battery pack to enter a ready-to-operate status.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, the battery cells in the battery pack as described in FIGS. 1-9b above are accommodated in thorough holes in the battery frames. However, it is clear that other structures and mechanisms may also be used according to the user's preference to install and fix the battery cells, including but not limited to non-encircling battery racks, heat shrink tubing, etc.

In addition, the battery pack internal circuit is exemplified in FIG. 11 as ten battery sets connected in series. In each battery set the three battery cells are connected in parallel as exemplified in FIGS. 9a and 9b. Those skilled in the art should realize that the battery connections in battery packs according to the present invention are not limited to as such. The battery cells can be configured in parallel, in serial, or in hybrid to form a battery set, and the battery sets can also be configured in parallel, in serial, or in hybrid.

In the examples shown in FIGS. 1-9b and 11, there are three configurable connectors provided in the internal electrical circuit of the battery pack, which are used as circuit breakers at certain points between the battery sets. However, it should be understood that any number of configurable connector can be used in the battery pack as long as they serve the purpose of interrupting the electrical circuit in the battery pack unless terminal connectors are inserted.

Also, in the configurable connector illustrated in FIGS. 1-9a, the terminal holder is configured as a separate component which can be freely detached or attached to the battery pack. In other implementations, however, the terminal holder may also be made with different structures. For example only, the terminal holder can be attached to the battery pack housing using resilient belts.

Figure 12:
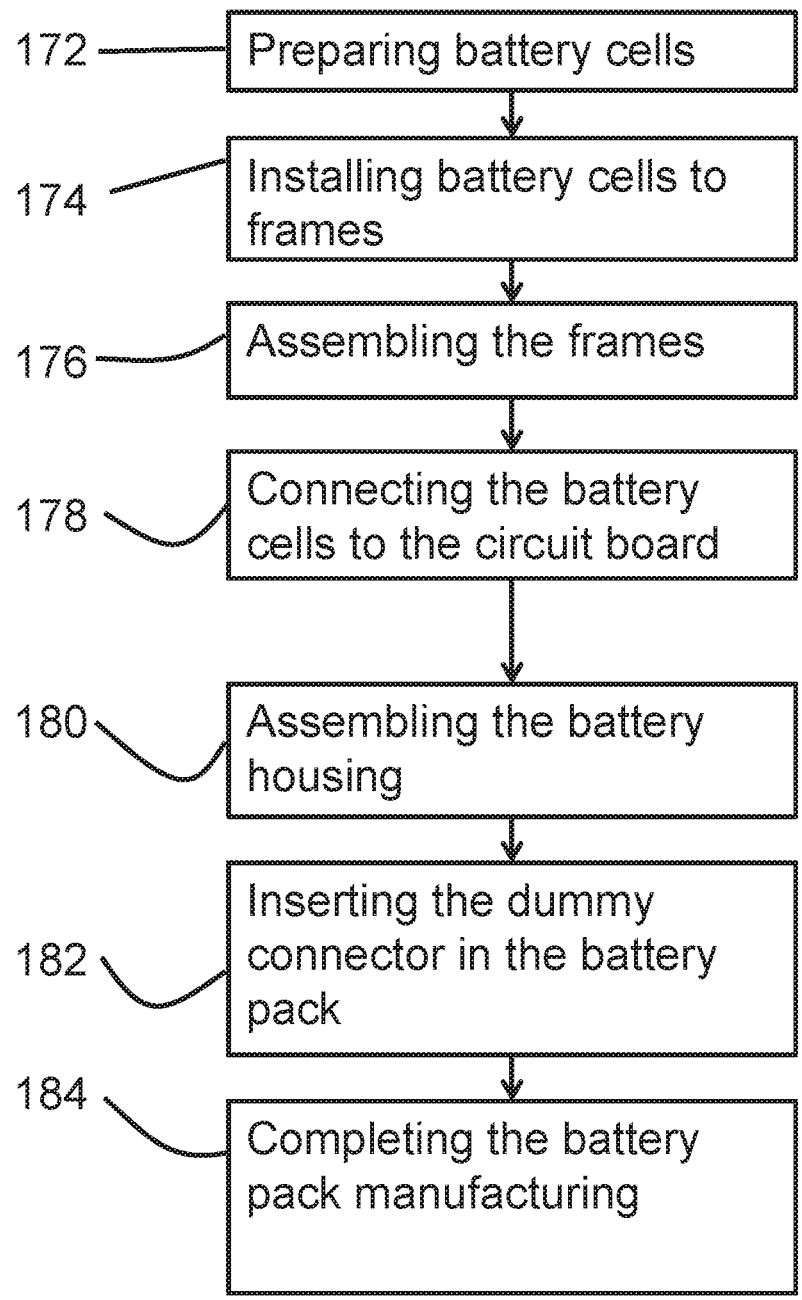
FIG. 12 is the flow chart showing the steps of manufacturing a battery pack according to one embodiment of the present invention.

In the flowchart of FIG. 12, a specific manufacturing procedure is shown as an example for the battery packs according to the present invention, including certain steps of installing battery cells and frames in sequence. However, one should understand that these steps are not limited as such, and that their orders can also be altered. The key point of the present invention falls onto the use of configurable connectors, and the arrangement of battery cells or their method of assembling can be varied according to particular applications on need.

The examples of the battery pack above use a dummy connector in place where the battery pack is not intended to be put into operation. As mentioned previously, the dummy connector is fully optional, and even without such dummy connector the internal wall of the battery housing would serve, to some extents, the purpose of avoid short or safety issues of the metal terminals in the configurable connectors.

The invention claimed is:

1. A battery pack comprising:
a frame;
two or more battery cells installed to the frame, the two or more battery cells being interconnected by a configurable connector configured to enable electrical connections between the two or more battery cells, wherein the configurable connector is adapted to be configured in a first status or a second status, wherein in the first status, the two or more battery cells are electrically connected and in the second status, the two or more battery cells are not electrically connected; and
a switch configured to control an electric circuit of the battery pack, wherein the switch is configured to switch on or off as an intermediate conductor electrically connects or disconnects from the two or more batteries.

2. The battery pack of claim 1, wherein the configurable connector further comprises two terminals which are separated from each other and connected to one of the two or more battery cells respectively; the two terminals being not electrically connected and thus the configurable connector being in the second status, unless the two terminals are connected by the intermediate conductor by which the configurable connector becomes to be in the first status.

3. The battery pack of claim 2, further comprises the intermediate conductor detachably connected to the two terminals of the configurable connector.

4. The battery pack of claim 3, wherein the two terminals are metal clips arranged to be parallel with each other; the intermediate conductor comprising a metal pin detachably inserted between the two metal clips so that the two terminals become electrically connected and the configurable connector becomes to be in the first status.

5. The battery pack of claim 3, further comprises two or more configurable connectors; the intermediate conductors of the two or more configurable connectors are fixedly connected together.

6. The battery pack of claim 2, further comprises a dummy connector, the dummy connector detachably connected to the two terminals and causing the two terminals to be electrically insulated.

7. The battery pack of claim 6, further comprises two or more configurable connectors; the battery pack further comprising two or more dummy connectors which are fixedly connected together.

8. The battery pack of claim 2, wherein the two terminals of the configurable connector are fixed to a circuit board.

9. The battery pack of claim 2, wherein the intermediate conductor is further connected with an actuating member adapted to trigger the switch; the switch switched on or off as the intermediate conductor connects or disconnects from the two terminals.

10. The battery pack of claim 1, wherein the switch is a push button.

11. The battery pack of claim 1, wherein the switch is surface-mounted on the circuit board.

12. The battery pack of claim 2, further comprising a housing accommodating the frame and the two or more battery cells; the housing further comprising a portion which protects the two terminals of the configurable connector from accidental contact with external objects; the portion of the housing formed with an opening which allows contact with the two terminals by the intermediate conductor.

13. The battery pack of claim 2, where the intermediate connector is a dual-purposes connector which is adapted to either electrically connect the two terminals of the configurable connector, or not causing the two terminals to be electrically connected.

14. The battery pack of claim 13, wherein the dual-purposes connector comprises a conducting members and an insulating member which are symmetrically configured on two ends of the dual-purposes connector respectively.

15. A method for putting a battery pack to work, comprising the steps of:
   in a manufacturing environment, preparing a battery pack comprising:
      a frame;
      two or more battery cells installed to the frame; the two or more battery cells interconnected by a configurable connector; the configurable connector further comprising two terminals which are separated from each other and not electrically connected, such that the two or more battery cells are not electrically connected; and
      a switch for controlling an electric circuit of the battery pack; and
   by an end user, connecting the two terminals of the conductive connector by an intermediate conductor whereby the configurable connector becomes switched on and the two or more battery cells become electrically connected, the intermediate conductor being further connected with an actuating member adapted to trigger the switch; the switch being switched on in the connecting step as the intermediate conductor connects to the two terminals.

16. The method of claim 15, wherein the two terminals are metal clips positioned in parallel; the intermediate conductor comprising a metal pin detachably inserted between the two metal clips so that the two terminals become electrically connected.

17. The method of claim 15, wherein the battery pack further comprises a dummy connector detachably connected to the two terminals and causing the two terminals to be electrically insulated; the method further comprises the step of disconnecting the dummy connector from the configurable connector prior to the connecting step.

18. The method of claim 15, wherein the battery pack further comprises a circuit board to which the two terminals are fixed.

19. The method of claim 15, wherein the switch is a push button.

20. The method of claim 19, wherein the battery pack further comprises a circuit board on which the electric circuit is implemented; the switch being surface-mounted on the circuit board.

21. The method of claim 15, wherein the battery pack further comprises a housing accommodating the frame and the two or more battery cells;
   the housing further comprising a portion which covers the two terminals of the configurable connector from accidental contact with external objects; the portion of the housing formed with an opening which allows contact with the two terminals by the intermediate conductor.

22. The method of claim 15, where the intermediate connector is a dual-purposes connector which is adapted to either electrically connect the two terminals of the configurable connector, or not causing the two terminals to be electrically connected.

23. The method of claim 22, wherein the dual-purposes connector comprises a conducting members and an insulating member which are symmetrically configured on two ends of the dual-purposes connector respectively.

* * * * *